(12) United States Patent
Burkert et al.

(10) Patent No.: US 7,331,253 B2
(45) Date of Patent: Feb. 19, 2008

(54) DEVICE FOR CARRYING AND FASTENING A ROBOT

(75) Inventors: Wolfgang Burkert, Neunkirch (CH); Harald Lenherr, Beringen (CH)

(73) Assignee: Robert Bosch GmbH (DE)

( * ) Notice: Subject to any disclaimer, the term of this patent is extended or adjusted under 35 U.S.C. 154(b) by 617 days.

(21) Appl. No.: 10/712,072

(22) Filed: Nov. 13, 2003

(65) Prior Publication Data
US 2004/0103741 A1 Jun. 3, 2004

(30) Foreign Application Priority Data
Nov. 29, 2002 (CH) .................................... 2018/02

(51) Int. Cl.
*B23Q 1/01* (2006.01)
*B25J 19/00* (2006.01)
(52) U.S. Cl. .................. 74/490.01; 248/121; 248/125.1
(58) Field of Classification Search ............. 74/490.01; 901/50; 248/121, 676, 903, 125.1, 122.1
See application file for complete search history.

(56) References Cited

U.S. PATENT DOCUMENTS

| | | | |
|---|---|---|---|
| 3,938,964 A * | 2/1976 | Schmidt ..................... 138/143 |
| 4,177,990 A * | 12/1979 | Kajiwara ..................... 473/521 |
| 4,407,625 A | 10/1983 | Shum | |
| 4,746,255 A | 5/1988 | Roccabianca et al. | |
| 4,976,582 A | 12/1990 | Clavel | |
| 5,115,690 A * | 5/1992 | Torii et al. ................ 74/490.02 |
| 6,250,174 B1 * | 6/2001 | Terada et al. ............ 74/490.02 |
| 6,499,704 B2 * | 12/2002 | Oddsen, Jr. .............. 248/125.1 |
| 6,623,169 B2 * | 9/2003 | Ward .......................... 384/624 |
| 2001/0042424 A1 * | 11/2001 | Sheehan et al. ............... 82/121 |

FOREIGN PATENT DOCUMENTS

| | | |
|---|---|---|
| DE | 100 624 217 | 12/2000 |
| DE | 100 51 707 | 7/2002 |
| GB | 2 046 691 | * 11/1980 |

OTHER PUBLICATIONS

Communication from European Patent Office regarding counterpart application.

\* cited by examiner

*Primary Examiner*—William C. Joyce
(74) *Attorney, Agent, or Firm*—Harness, Dickey & Pierce, P.L.C.

(57) ABSTRACT

A device for carrying and fastening a robot (4), in particular a delta robot, is designed in a gallows shape. It has a foot (1), a column (2) adjoining the foot (1), and at least one cantilever arm (3), fastened to this column (2), for fastening the robot (4). The cantilever arm (3) in this case is fastened to the column (2) in a fixed position. The device consists at least partly of a composite material, in particular a cast mineral. This device for carrying and fastening a robot is extremely space-saving and nonetheless has good vibration-damping properties.

12 Claims, 6 Drawing Sheets

DEVICE FOR CARRYING AND FASTENING A ROBOT

TECHNICAL FIELD

The invention relates to a device for carrying and fastening a robot. The device is suitable in particular for fastening robots which are movable in three-dimensional space, in particular delta robots.

BACKGROUND OF THE INVENTION

A robot, that is to say the actual actuating unit, must be fastened in a carrier device. This carrier device should be as robust as possible and have good vibration-damping properties. In addition, it is to allow as large a freedom of movement as possible for the robot.

Robots which are movable in three-dimensional space are normally arranged in steel frames, what are referred to as cells. These frames comprise top and bottom horizontal components which are connected to one another via a vertical component. These frames are certainly robust. They can also be cleaned easily, which is an essential prerequisite in particular when the robot is used in the foodstuffs industry. A disadvantage, however, is that the carrier device takes up a relatively large amount of space, so that the individual robots cannot be set up in any desired arrangement. The space requirement is increased even further by associated switch cabinets. Furthermore, these carrier devices are relatively expensive. The reasons for this are the material requirements for steel, in particular high-grade steel, and the expensive manufacture, since the individual struts and supports have to be welded and/or screwed to one another.

Furthermore, DE-A-100,64,217 discloses an actuating unit which together with its carrier device has a gallows-shaped design. The carrier device as such consists of a horizontal base and a slightly curved column-like fixed cantilever. A rotary block of the actuating unit is arranged on the top end of the fixed cantilever, a horizontal arm of the actuating unit being mounted in this rotary block. The arm in this case is pivotable about four axes.

Furthermore, U.S. Pat. No. 4,746,255 discloses a carrier device for an actuating unit which is likewise designed together with the actuating unit in a gallows shape. The carrier device itself consists of a horizontal foot and a vertical column arranged on the foot. A movable arm of the actuating unit is arranged on this column and is displaceably guided along the column. Further components of the actuating unit are arranged on the arm such as to be displaceable in the longitudinal direction.

SUMMARY OF THE INVENTION

It is an object of the invention is to provide a device for carrying and fastening a robot, in particular a delta robot, this device being as space-saving as possible and nonetheless having good vibration-damping properties.

This object is achieved by a device having the features of claim 1.

The device according to the invention for carrying and fastening a robot is designed in a gallows shape having a foot, a column adjoining the foot, and at least one cantilever arm, fastened to this column, for fastening the robot. In this case, the at least one cantilever arm is fastened to the column in a fixed position. The at least one cantilever arm is preferably fastened solely to this column. This gallows-shaped construction permits a space-saving configuration of the device and nonetheless allows the greatest possible freedom of movement for the robot fastened thereto.

In addition, since the device consists at least partly of a composite material, in particular a cast mineral, it has a vibration-damping effect, which is a necessary condition in particular when using high-performance robots, such as delta robots for example.

In a preferred embodiment, the column has a niche for accommodating at least some of the components of control electronics. As a result, an additional switch cabinet is unnecessary, which in turn greatly reduces the space requirement.

In addition, the device according to the invention can be produced in a simple and cost-effective manner.

Further advantageous embodiments follow from the dependent patent claims.

BRIEF DESCRIPTION OF THE DRAWING

The subject matter of the invention is explained below with reference to preferred exemplary embodiments which are shown in the attached drawing, in which.

PREFERRED EMBODIMENTS

Figure 1:
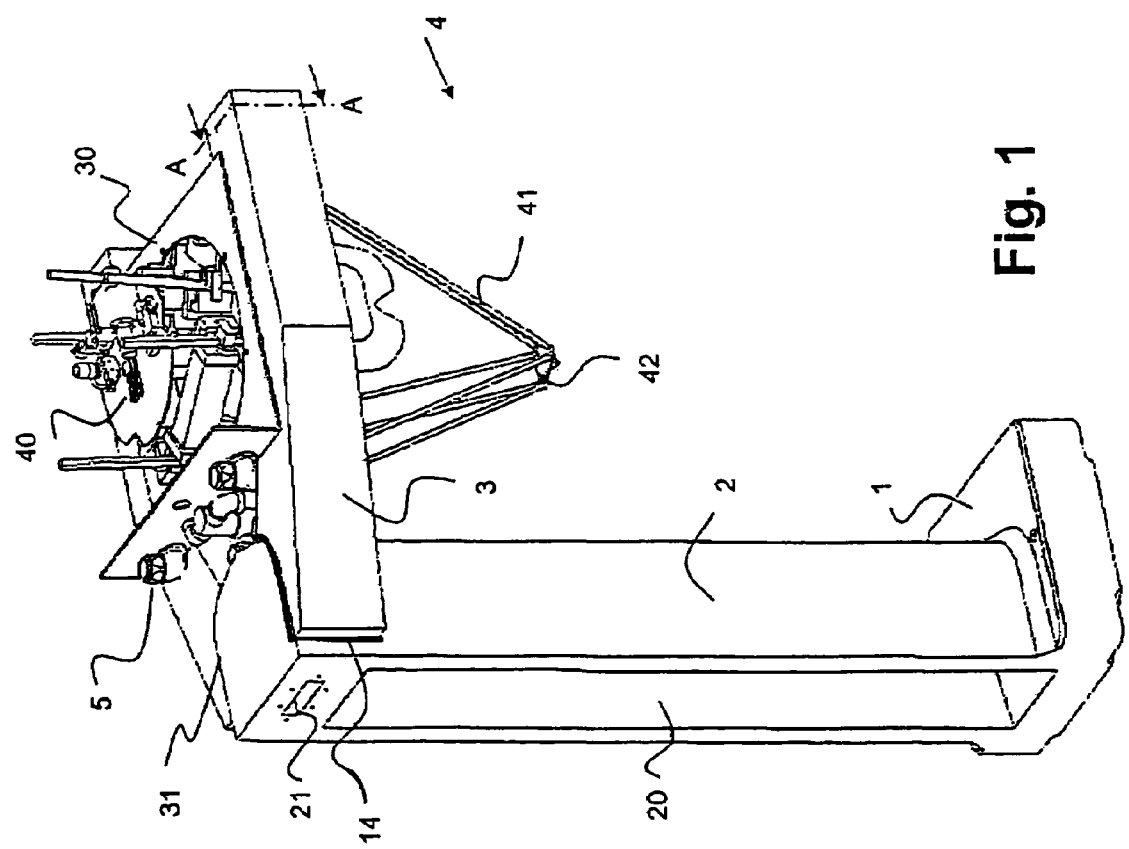
FIG. 1 shows a perspective representation of a device according to the invention in accordance with a first embodiment having a delta robot fastened thereto.

A first embodiment of a device according to the invention is shown in FIG. 1. The device is designed in a gallows shape and has three components: a bottom horizontal component, a vertical component and a top essentially horizontal component. These components are formed in this sequence by a foot 1, a column 2 adjoining the foot 1 and at least one cantilever arm 3. The cantilever arm 3 preferably extends in an exactly horizontal direction. However, it is also possible for it not to form a right angle to the column 2. The foot 1 preferably extends in the same direction as the at least one cantilever arm 3, but is normally designed to be shorter. The foot 1 and/or the at least one cantilever arm preferably do not project on the opposite side of the column 2.

The foot 1 and column 2 are preferably made together in one piece, as shown here. However, they can also be composed of two or more parts. The at least one cantilever arm 3 is fastened to the column 2 in a fixed position. It is preferably fastened solely to this column 2.

Here, there are two cantilever arms 3, which are designed in mirror image to one another. They are arranged at the same height but at a distance from one another on the column 2. It is also possible to provide a single cantilever arm which is of fork-shaped design in the front end remote from the column 2. A robot 4 can be arranged in the intermediate space between the cantilever arms 3 or the fork. In the exemplary embodiment shown here, this is a delta robot.

Such delta robots are known. They are described, for example, in U.S. Pat. No. 4,976,582. The delta robot 4 has a base plate 40 with motors fastened thereto. The axes of the three motors form an equilateral triangle. Arranged on the base plate 40 are pivotable robot arms 41, which are fastened in a pivotable manner to a picker plate 42 at their bottom end at a distance from the base plate 40. Arranged on the picker plate 42 is a gripping means for seizing and transferring an individual article. For example, the gripping means is a suction element. In addition, such robots may have a fourth axis, which extends away from the base plate 40 to the picker plate 42 and serves to actuate the gripping means.

There is a carrying plate 30 for fastening the robot 4, this carrying plate 30 being put onto the two cantilever arms 3 and being fastened there. For example, it is screwed on. This carrying plate 30 has a circular central opening in which the robot 4 is set. The base plate 40 is fastened to the carrying plate 30 with suitable means. However, other types of fastening are also possible. In particular, the type of fastening depends on the type of robot used. However, the robot is always fastened in an adjustable manner to at least one cantilever arm 3.

In addition, connections 5 for the pneumatic system for actuating the robot are shown in FIG. 1. These connections 5 are preferably arranged adjacent to the column 2.

Figure 3:
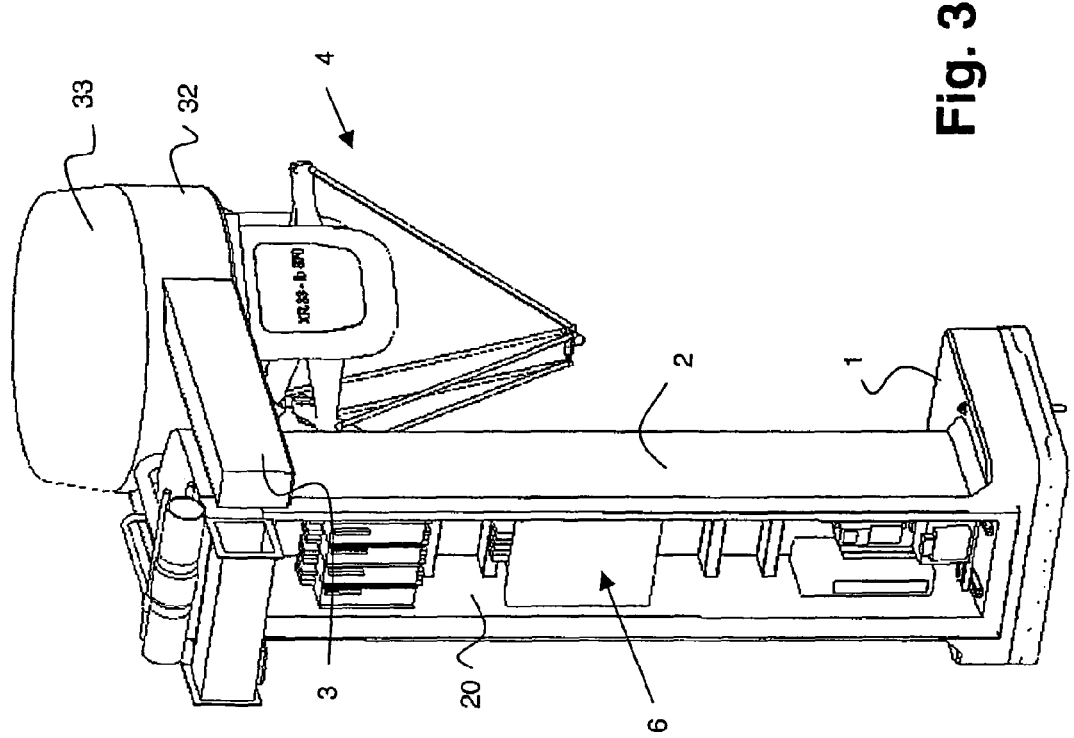
FIG. 3 shows a perspective representation of a device according to the invention in accordance with a third embodiment having a delta robot fastened thereto.

In addition, the column 2 has at least one niche 20. The latter preferably extends over at least approximately the entire length of the column 2. Electrical lines and components of the control electronics, a PC, transformers and the like can be accommodated in this niche 20. All the control electronics 6 belonging to the robot are preferably accommodated therein, as shown in FIG. 3. As a result, a separate switch cabinet is unnecessary. It is also possible to accommodate components of the pneumatic system, in particular pneumatic feed lines, in the niche 20. If both electronic and pneumatic components are to be accommodated, it is advisable to provide two niches 20 separated from one another. In order to be able to install the individual components in a simpler manner, the niche 20 preferably has retaining means, which, for example, when using a cast mineral as column material, can already be integrated in the production process of the column hollow body.

Furthermore, the column 2 has at least one leadthrough opening 21 for passing feed lines through. Here, the niche 20 is used solely for electronic components. The leadthrough opening 21 serves, for example, to accommodate the communication cables amongst each other between devices V according to the invention within a picker line and/or electric cables.

Figure 7:
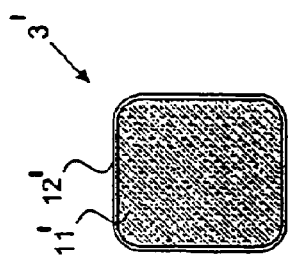
FIG. 7 shows a cross sectional view of a cantilever arm.
Figure 8:
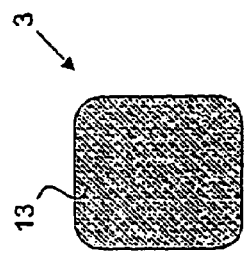
FIG. 8 shows a cross sectional view of the cantilever arm of FIG. 1 along the lines A-A.

At least part of the device consists of a composite material. The column 2 and the foot 1 preferably consist entirely of a composite material. The cantilever arms 3, in a first variant (FIG. 8), are likewise produced entirely from a composite material and therefore form a solid body 13. In a second variant (FIG. 7), cantilever arms 3' have a core 11' consisting of a composite material and an outer envelope 12' consisting of another material, in particular high-grade steel. In a third embodiment, cantilever arms are designed to be hollow on the inside, so that lines for the robot 4 can be passed through. In this case, the hollow body preferably consists of a composite material, in particular a cast mineral.

A suitable composite material is in particular a cast mineral. This composite material normally comprises essentially about 90-93% of minerals and stones and 7-10% of epoxy resin. Cast mineral is known in mechanical engineering. The preparation varies depending on the type of stone and grain size. A 3-component polymer concrete on an epoxy resin basis with a filler combination on a quartzitic basis has proved successful for the device according to the invention. However, other compositions are also possible.

Bodies consisting of a cast mineral are characterized by high mechanical strength and excellent vibration-damping properties, which are about 10 times better than in bodies of gray cast iron. Since the bodies are produced by cold casting, a wide range of design forms is possible. In particular the abovementioned niches 20 and the retaining means formed in the cavity can be produced in the simplest manner. Further properties are the good chemical resistance, the thermal stability and the relatively cost-effective manufacture.

In addition, the cast mineral can be provided with additives. The cast mineral used in the device according to the invention is therefore provided with at least one additive which has an effect inhibiting microorganisms. This is advantageous in particular in the foodstuffs industry.

In addition, components consisting of a cast mineral can be connected in a simple manner. The at least one cantilever arm 3 is therefore preferably adhesively bonded to the column 2 (FIG. 1), a suitable adhesive 14 being a cast mineral of very fine grain size. This shortens the assembly time and thus in turn reduces the production costs. This adhesive connection has further advantages. The homogeneous surface produced by the adhesive connection can be cleaned in a simple manner. In addition, the rigidity of the device is increased.

The adhesive connection is facilitated if column 2 and cantilever arm 3 are formed appropriately. In this example, the column 2 has a U-shaped cross section, the curved surface facing the cantilever arms 3. The cantilever arms 3 have a curved indentation 31, the radius of curvature of which corresponds to the radius of curvature of the outer lateral surface of the column 2.

Figure 2:
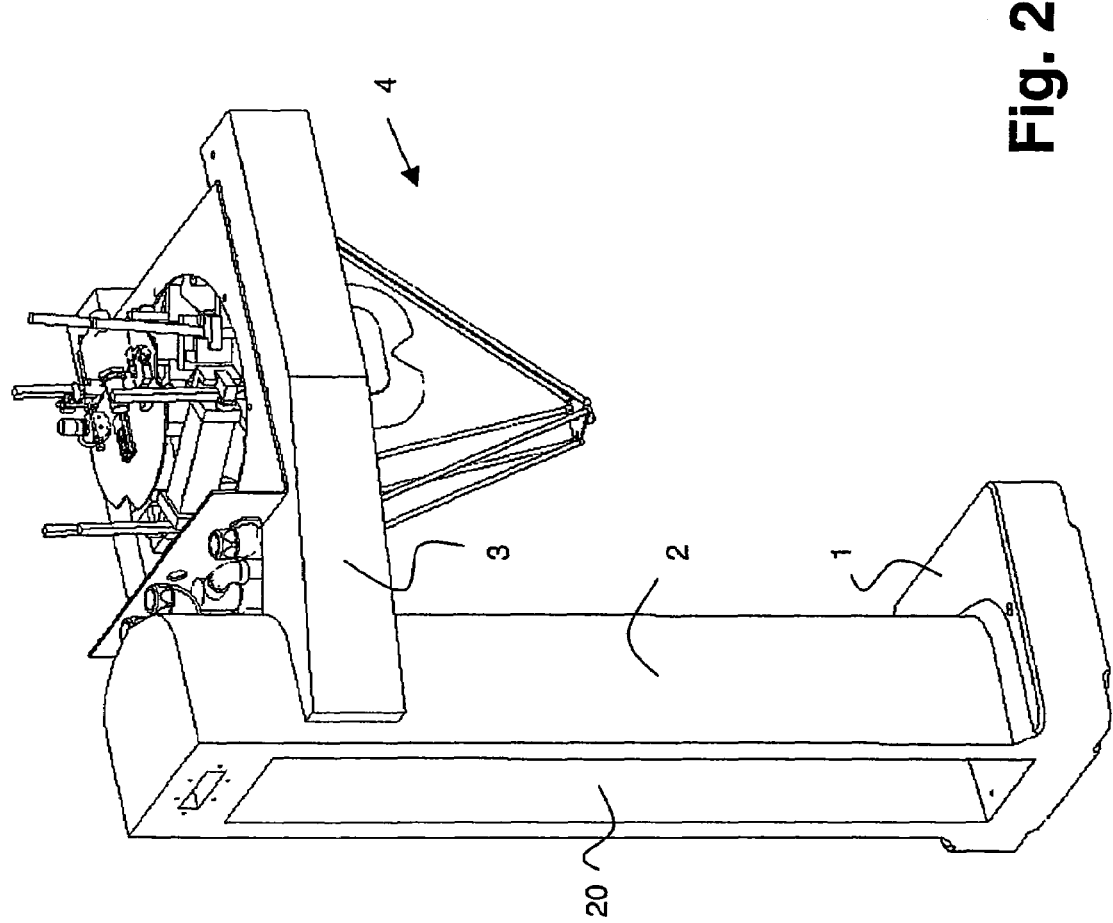
FIG. 2 shows a perspective representation of a device according to the invention in accordance with a second embodiment having a delta robot fastened thereto.

The column 2 preferably has a uniform cross section at least over part of its length, so that the cantilever arms 3, depending on the field of use and robot to be accommodated, can be fastened to the column 2 at any desired height. In FIG. 1, they are arranged at the top end of the column 2. In the exemplary embodiment according to FIG. 2, they are arranged further down. This in turn reduces the production costs, since the same device can be used for various fields of application. Only the cantilever arms 3 have to be fitted at the desired, predetermined height. However, a simple template or straightforward measurement of the height is sufficient for this purpose.

Another type of fastening for a robot is shown in the embodiment according to FIG. 3. Spaced-apart cantilever arms 3 are again arranged on the column 2 at the same height. These cantilever arms 3 merge into a circular robot receptacle 32 at their front end remote from the column 2. The robot 4, again a delta robot in this case, is fastened in this robot receptacle 32. The robot receptacle 32 is closed with a cover 33 for protecting the electronics of the robot 4.

The robot 4 can also be fastened by a carrier being put onto and connected to each cantilever arm 3. The robot can be fastened to this carrier. The robot can thus be arranged, for example, above the maximum length of the column 2 in a cost-effective manner.

Figure 4:
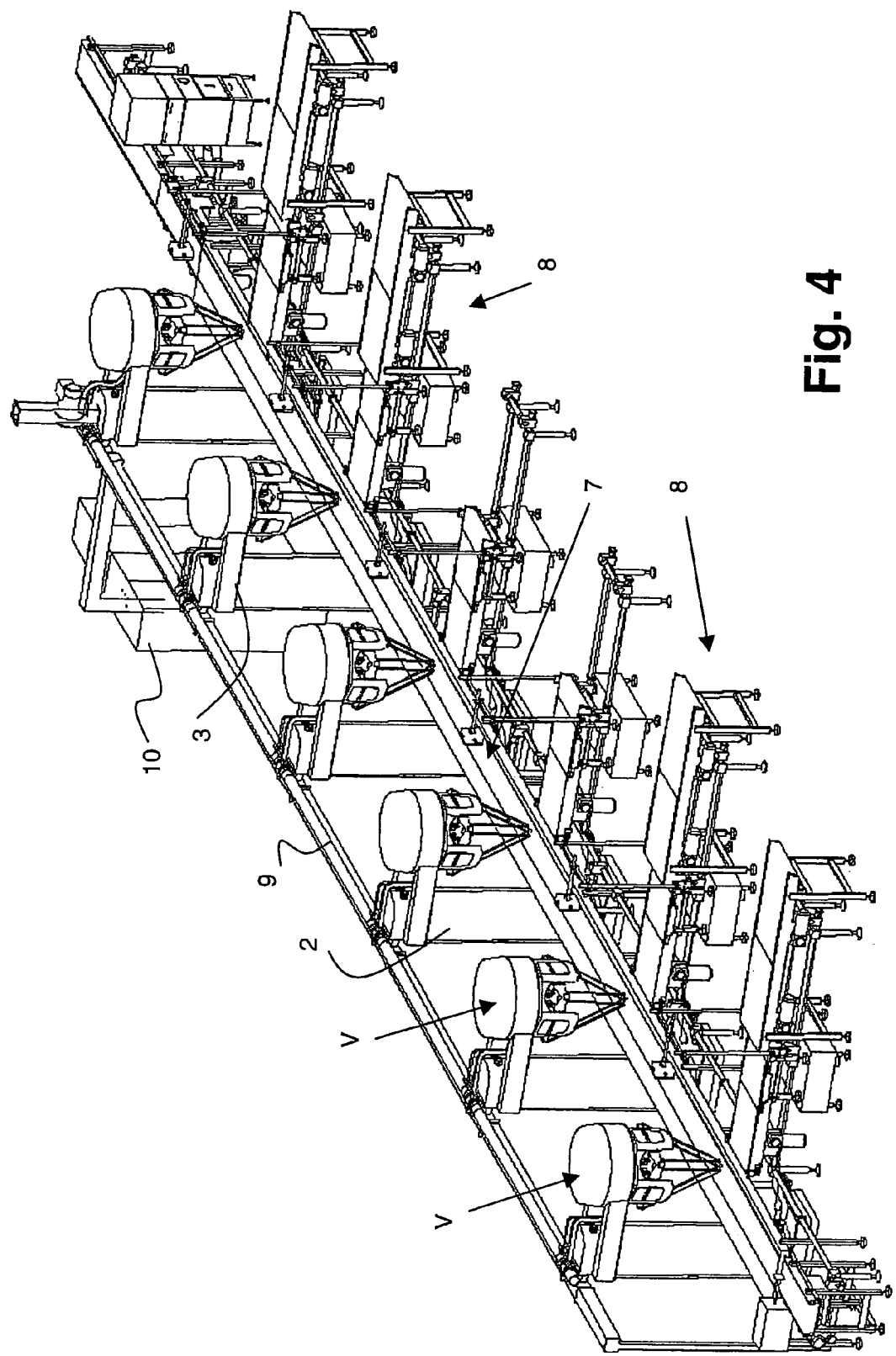
FIG. 4 shows a first arrangement of a plurality of devices according to the invention along a picker line.
Figure 5:
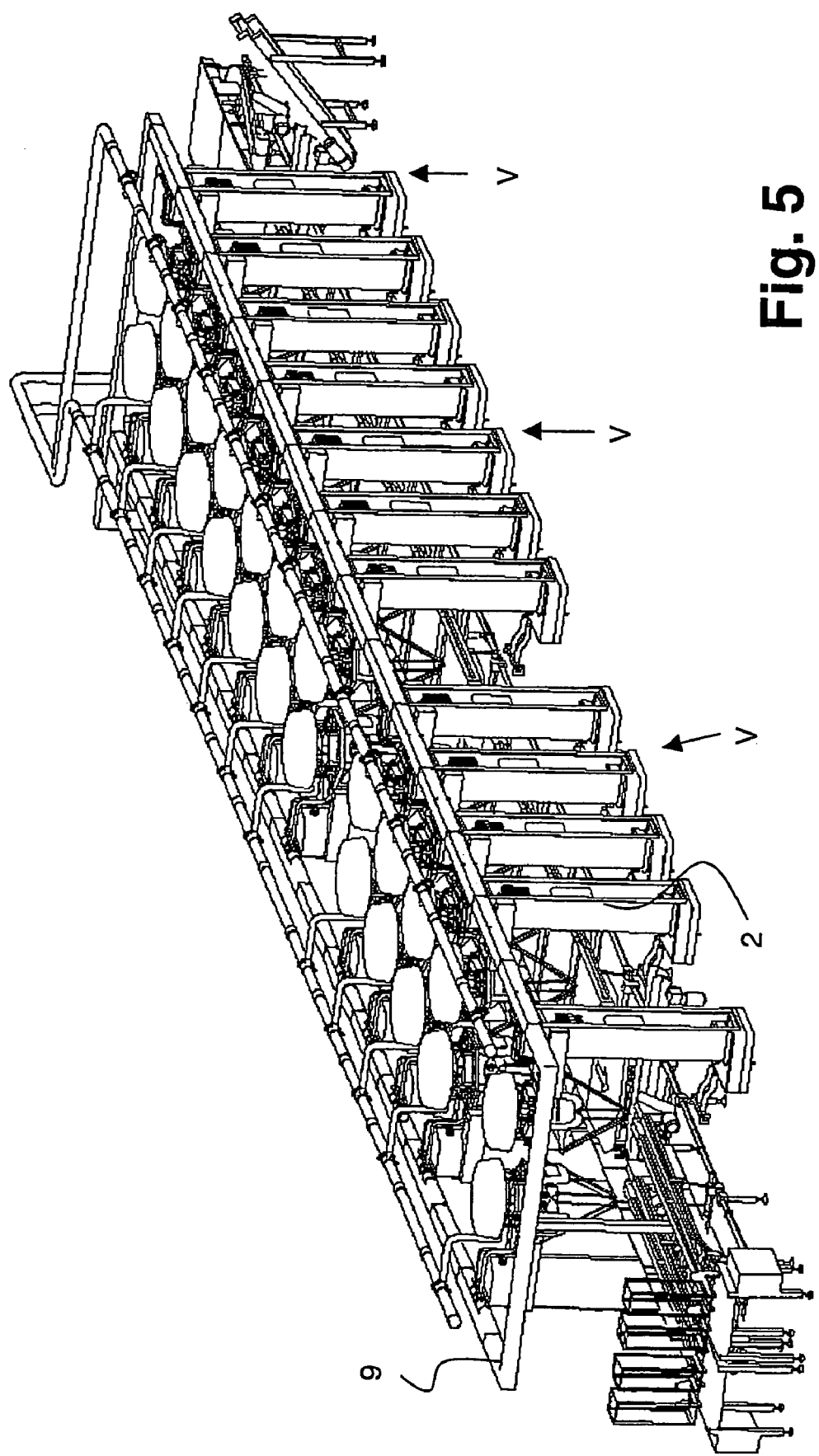
FIG. 5 shows a second arrangement.
Figure 6:
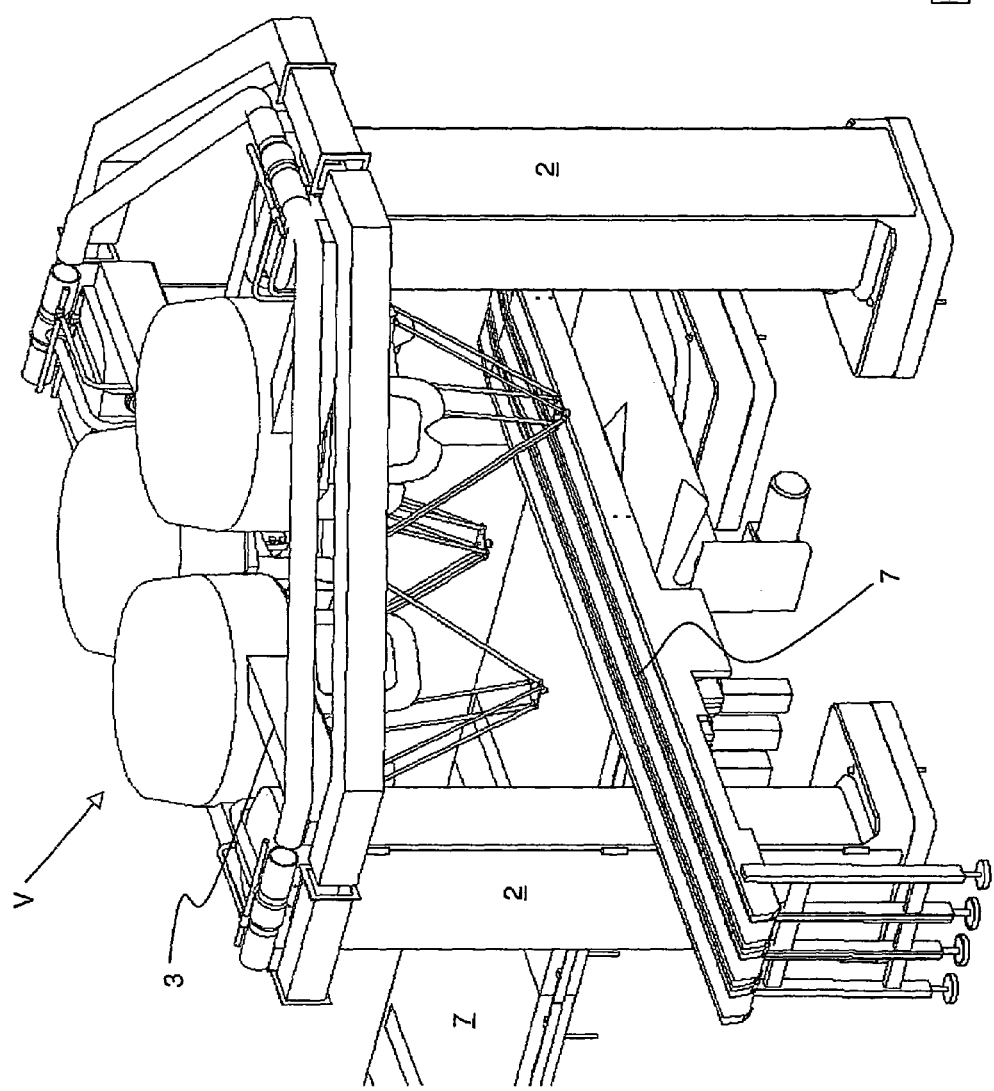
FIG. 6 shows a third arrangement.

Various arrangements of the device according to the invention in use are shown in FIGS. 4 to 6. FIG. 4 shows a picker line with a rectilinear conveying section 7, adjoining which are feeder stations 8. A device V according to the invention with a robot 4 is arranged at each feeder station 8 on the opposite side of the conveying section 7. Since each robot has its control electronics integrated in the column 2 of the associated carrier device V, there are no separate switch cabinets. There is only one central switch cabinet 10 at an end of the picker line in order to coordinate the individual robots. The feed lines to the individual robots and also the pneumatic and electrical supply are implemented via the common connecting line 9.

A similar arrangement is shown in FIG. 5, carrier devices V with robots being arranged here on both sides of the picker line.

As can be seen in FIG. 6, the devices V according to the invention can also be arranged in a triangle in an extremely space-saving manner. This is especially advantageous at crossings of two conveying sections 7.

The device according to the invention for carrying and fastening a robot is therefore extremely space-saving and nonetheless has good vibration-damping properties.

| List of reference numbers |
| --- |
| 1 Foot |
| 2 Column |
| 20 Niche |
| 3 Cantilever arm |
| 30 Carrying plate |
| 31 Indentation |
| 32 Robot receptacle |
| 33 Cover |
| 4 Robot |
| 40 Base plate |
| 41 Robot arms |
| 42 Picker plate |
| 5 Connections |
| 6 Control electronics |
| 7 Conveying section |
| 8 Feeder stations |
| 9 Connecting line |
| 10 Central switch cabinet |
| V Device according to the invention |

The entire disclosure of Switzerland Patent Application No. 2002 2018/02 filed Nov. 29, 2002 is hereby incorporated by reference.

The invention claimed is:

1. A device for carrying and fastening a robot, the device comprising:
    a bottom horizontal component, a vertical component and a top at least approximately horizontal component connected to the robot,
    wherein the device has a foot as the bottom horizontal component, a column, adjoining the foot, as the vertical component, and at least one cantilever arm, fastened to this column, as the top component for fastening the robot, the at least one cantilever arm being fastened to the column in a fixed position at substantially any desired height along the length of the column,
    wherein the device includes a composite material,
    wherein the column has at least one niche for accommodating components of control electronics and/or pneumatic components for the robot, and
    wherein the at least one cantilever arm is connected to the column by an adhesive.

2. The device as claimed in claim 1, wherein the at least one cantilever arm is fastened solely to the column.

3. The device as claimed in claim 1, wherein the foot, the column and the at least one cantilever arm each include a composite material.

4. The device as claimed in claim 3, wherein the composite material is a cast mineral containing at least one additive which has an effect inhibiting microorganisms.

5. The device as claimed in claim 3, wherein the column and the one cantilever arm each include a cast mineral.

6. The device as claimed in claim 1, wherein the at least one cantilever arm has a core including a composite material and an outer envelope including another material.

7. The device as claimed in claim 6, wherein the outer envelope includes high-grade steel.

8. The device as claimed in claim 1, wherein the at least one cantilever arm is designed as a solid body.

9. The device as claimed in claim 1, wherein there are two cantilever arms which are arranged on the column at the same height, and at a distance from one another, for accommodating the robot in an intermediate space produced in between the cantilever arms.

10. The device as claimed in claim 1, wherein the foot and the at least one cantilever arm extend in a first direction away from the column and do not project beyond the column in a direction opposite the first direction.

11. The device as claimed in claim 1, wherein the robot is a delta robot.

12. The device as claimed in claim 1, wherein the at least one cantilever arm is connected to the column by a cast mineral.

* * * * *